(12) United States Patent
Kraut et al.

(10) Patent No.: US 11,796,629 B2
(45) Date of Patent: Oct. 24, 2023

(54) PHASE MEASUREMENT IN A RADAR SYSTEM

(71) Applicant: Infineon Technologies AG, Neubiberg (DE)

(72) Inventors: Gunther Kraut, Egmating (DE); Jonas Eric Sebastian Fritzin, Munich (DE)

(73) Assignee: Infineon Technologies AG, Neubiberg (DE)

( * ) Notice: Subject to any disclaimer, the term of this patent is extended or adjusted under 35 U.S.C. 154(b) by 521 days.

(21) Appl. No.: 16/949,870

(22) Filed: Nov. 18, 2020

(65) Prior Publication Data

US 2021/0156983 A1 May 27, 2021

(30) Foreign Application Priority Data

Nov. 22, 2019 (DE) .......................... 102019131677.4

(51) Int. Cl.
*G01S 7/03* (2006.01)
*G01S 7/40* (2006.01)

(52) U.S. Cl.
CPC ............ *G01S 7/032* (2013.01); *G01S 7/4008* (2013.01)

(58) Field of Classification Search
CPC .................. G01S 7/03–032; G01S 7/40–4021
See application file for complete search history.

(56) References Cited

U.S. PATENT DOCUMENTS

| 8,723,568 B1* | 5/2014 | Terrovitis | H03L 7/16 327/148 |
| 2016/0329935 A1* | 11/2016 | Singeri | H04B 1/0475 |
| 2017/0249225 A1* | 8/2017 | Guddeti | G06F 11/263 |

FOREIGN PATENT DOCUMENTS

DE         102016123459 B3      5/2018

* cited by examiner

*Primary Examiner* — Matthew M Barker
(74) *Attorney, Agent, or Firm* — Harrity & Harrity, LLP (57) ABSTRACT

A method for determining phase information in a radar system comprises receiving a first RF oscillator signal at a first input node and receiving a second RF oscillator signal at a second input node, wherein an arrangement having a multiplicity of delay elements is connected between the first input node and the second input node, and wherein corresponding RF signals representing a superposition of first RF oscillator signal and second RF oscillator signal are present at different positions of the arrangement. The method further comprises generating measurement values representing the amplitudes of the RF signals, generating digital representations of the measurement values, and calculating a relative phase value, representing the difference between the phase of the second RF oscillator signal and the phase of the first RF oscillator signal, on the basis of the digital representations of the measurement values.

19 Claims, 7 Drawing Sheets

PHASE MEASUREMENT IN A RADAR SYSTEM

CROSS REFERENCE TO RELATED APPLICATION

This application claims priority to German Patent Application No. 102019131677.4 filed on Nov. 22, 2019, the content of which is incorporated by reference herein in its entirety.

TECHNICAL FIELD

The present description relates to the field of radio-frequency (RF) circuits. Some example implementations relate to a device.

BACKGROUND

Radio-frequency (RF) transmitters and receivers are used in a multiplicity of applications, for example in the field of wireless communication and radar sensors. In the automotive field, radar sensors are used, inter alia, in driver assistance systems (Advanced driver assistance systems, ADAS) such as e.g. in cruise control (ACC, Adaptive Cruise Control, or Radar Cruise Control) systems. Such systems can automatically adapt the speed of an automobile in order thus to maintain a safe distance from other automobiles ahead (and also from other objects and pedestrians). Further applications in the automotive field are e.g. blind spot detection, lane change assist and the like. In the field of autonomous driving, radar sensors and systems comprising a plurality of sensors will play an important part for the control of autonomous vehicles.

Modern radar systems use large-scale integrated RF circuits which can combine all core functions of an RF front end of a radar transceiver in a single housing (single-chip radar transceiver). Such large-scale integrated RF circuits are usually referred to as MMICs. An RF front end usually (but not necessarily) includes, inter alia, a voltage controlled oscillator (VCO) connected in a phase locked loop, power amplifiers (PAs), directional couplers, mixers and associated control circuit arrangements for controlling and monitoring the RF front end. An MMIC can also comprise circuits for the analog signal processing in baseband (or an intermediate frequency band) and analog-to-digital converters (ADCs), in order to enable digital signal processing.

In sensor applications, a plurality of MMICs can also be interconnected (cascaded), for example in order to emit and/or to receive RF radar signals via a plurality of antennas. Such arrangements comprising a plurality of MMICs and a plurality of antennas can be used for beamforming techniques, for example. A plurality of transmitting and receiving antennas are necessary, inter alia, if the angle of incidence of the received radar echoes (DoA, Direction of Arrival) is intended to be ascertained. In order to enable a reliable measurement, the phases of the emitted RF radar signals are in a defined relationship to one another. A calibration of the phases uses a phase measurement, which poses a certain challenge at frequencies in the EHF (Extremely High Frequency) range.

SUMMARY

A circuit for determining phase information in a radar system is described below. In accordance with one example implementation, the circuit comprises the following: a first input node configured to receive a first RF oscillator signal; a second input node configured to receive a second RF oscillator signal; an arrangement having a multiplicity of delay elements connected in series between the first input node and the second input node; a measuring circuit configured to receive RF signals present at different positions of the arrangement, and further configured to generate output signals representing the amplitude values of the received RF signals; an analog/digital (A/D) converter circuit configured to generate corresponding digital representations of the amplitude values on the basis of the output signals of the measuring circuit; and a computing unit configured to calculate, on the basis of the digital representations of the amplitude values, a relative phase value representing the difference between the phase of the second RF oscillator signal and the phase of the RF oscillator signal.

Furthermore, a method for determining phase information in a radar system is described. In accordance with one example implementation, the method comprises receiving a first RF oscillator signal at a first input node and receiving a second RF oscillator signal at a second input node, wherein an arrangement having a multiplicity of delay elements is connected between the first input node and the second input node, and wherein corresponding RF signals representing a superposition of first RF oscillator signal and second RF oscillator signal are present at different positions of the arrangement. The method further comprises generating measurement values representing the amplitudes of the RF signals, generating digital representations of the measurement values, and calculating a relative phase value, representing the difference between the phase of the second RF oscillator signal and the phase of the first RF oscillator signal, on the basis of the digital representations of the measurement values.

BRIEF DESCRIPTION OF THE DRAWINGS

Example implementations are explained in greater detail below with reference to figures. The illustrations are not necessarily true to scale and the example implementations are not restricted only to the aspects illustrated. Rather, importance is attached to illustrating the principles underlying the example implementations. In the figures.

DETAILED DESCRIPTION

Figure 1:
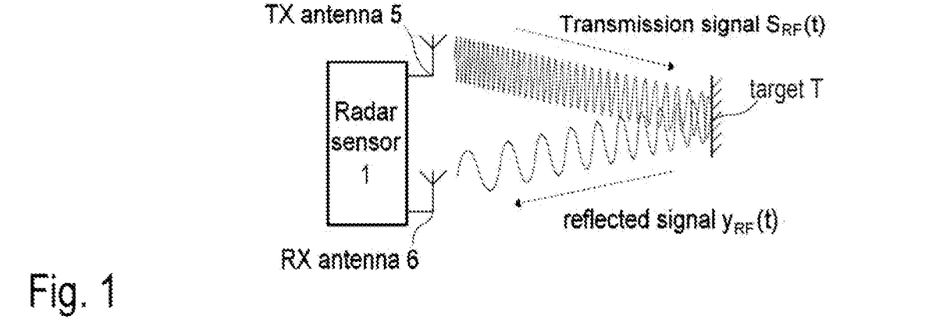
FIG. 1 is a schematic diagram for illustrating the functional principle of an FMCW radar system for distance and/or speed measurement.

FIG. 1 illustrates the application of an FMCW radar system as sensor for the measurement of distances and speeds of objects, which are usually referred to as radar targets. In the present example, the radar device 1 comprises separate transmitting (TX) and receiving (RX) antennas 5 and 6, respectively (bistatic or pseudo-monostatic radar configuration). It should be noted, however, that one antenna can also be used, which serves simultaneously as transmitting antenna and as receiving antenna (monostatic radar configuration). The transmitting antenna 5 emits an RF signal $s_{RF}(t)$, which is frequency-modulated for example with a linear chirp signal (periodic, linear frequency ramp). The emitted signal $s_{RF}(t)$ is backscattered at the radar target T and the backscattered (reflected) signal $y_{RF}(t)$ is received by the receiving antenna 6. FIG. 1 shows a simplified example; in practice, radar sensors are systems comprising a plurality of transmitting (TX) and receiving (RX) channels, and the RF signal $s_{RF}(t)$ includes a sequence of chirps.

Figure 2:
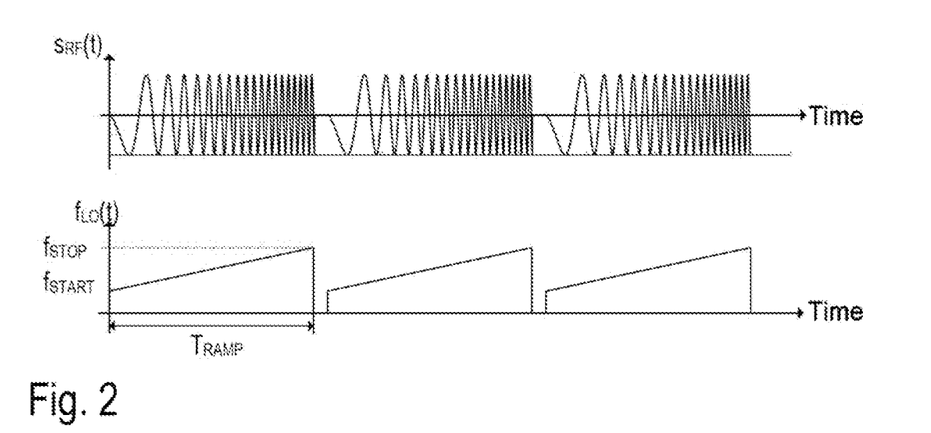
FIG. 2 comprises two timing diagrams for illustrating the frequency modulation of the RF signal generated by the FMCW system.

FIG. 2 illustrates by way of example the abovementioned frequency modulation of the signal $s_{RF}(t)$. As illustrated in FIG. 2, the signal $s_{RF}(t)$ is composed of a multiplicity of "chirps", that is to say that signal $s_{RF}(t)$ comprises a sequence of sinusoidal signal profiles (waveforms) having a rising (up-chirp) or falling (down-chirp) frequency (see upper diagram in FIG. 2). In the present example, the instantaneous frequency f(t) of a chirp beginning at a Start frequency $f_{START}$ rises linearly within a time period $T_{RAMP}$ to a stop frequency $f_{STOP}$ (see lower diagram in FIG. 2). Such chirps are also referred to as linear frequency ramps. FIG. 2 illustrates three identical linear frequency ramps. It should be noted, however, that the parameters $f_{START}$, $f_{STOP}$, $T_{RAMP}$ and also the pauses between the individual frequency ramps can vary. The frequency variation also need not necessarily be linear. Other modulation techniques can also be used as an alternative to a frequency modulation.

Figure 3:
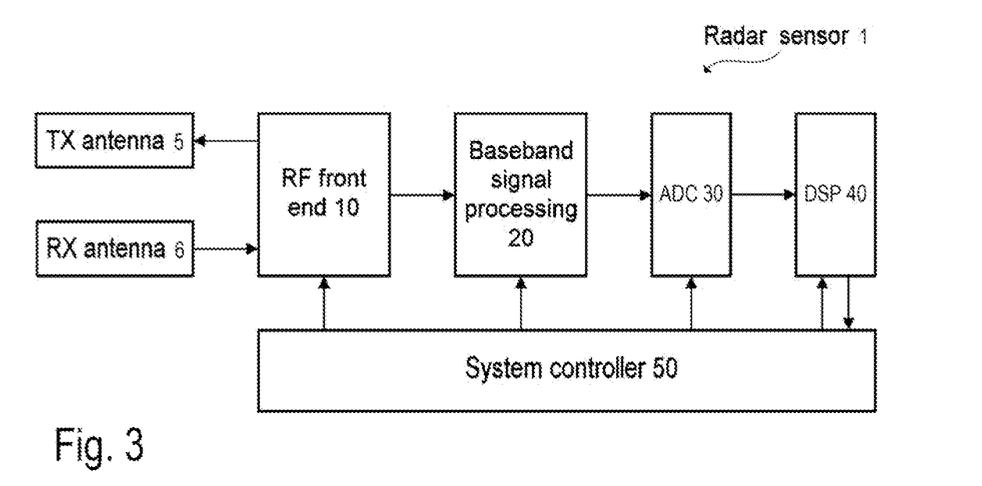
FIG. 3 is a block diagram for illustrating the fundamental structure of an FMCW radar system.

FIG. 3 is a block diagram which illustrates one possible structure of a radar device 1 (radar sensor) by way of example. Accordingly, at least one transmitting antenna 5 (TX antenna) and at least one receiving antenna 6 (RX antenna) are connected to an RF front end 10 which is integrated in an MMIC and which can include all those circuit components which are required for the RF signal processing. The circuit components comprise for example a local oscillator (LO), RF power amplifiers, phase shifters, low-noise amplifiers (LNAs), directional couplers (e.g. rat race couplers, circulators, etc.) and mixers for down-converting the RF signals to baseband or an intermediate frequency band (IF band). The RF front end 10—if appropriate together with further circuit components—can be integrated in an MMIC (radar chip). The example illustrated shows a bistatic (or pseudo-monostatic) radar system comprising separate RX and TX antennas. In the case of a monostatic radar system, a single antenna would be used both for emitting and for receiving the electromagnetic (radar) signals. In this case, a directional coupler (e.g. a circulator) can be used to separate the RF signals to be emitted from the RF signals (radar echoes) received. As mentioned, radar systems in practice usually comprise a plurality of transmitting and receiving channels having a plurality of transmitting and receiving antennas, respectively, which makes it possible, inter alia, to measure the direction (DoA, direction of arrival) from which the radar echoes are received. This direction is usually represented by an angle (azimuth angle). In MIMO systems of this type, the individual TX channels and RX channels are usually constructed identically or similarly in each case. That is to say that the radar front end 10 can comprise a multiplicity of transmitting and receiving channels which can be distributed among a plurality of radar chips. In the case of MIMO systems, the phases of the emitted RF radar signals relative to one another are of importance.

In the case of a frequency-modulated continuous-wave radar system (FMCW radar system), the RF signals emitted via the TX antenna 5 can lie e.g. in the range of approximately 20 GHz to 100 GHz (e.g. around 77 GHz in some applications). As mentioned, the RF signal received by the RX antenna 6 comprises the radar echoes, e.g. those signal components which are backscattered at one or at a plurality of radar targets. The received RF signal $y_{RF}(t)$ is e.g. down-converted to baseband and processed further in baseband using analog signal processing (see FIG. 3, analog baseband signal processing chain 20). The analog signal processing mentioned substantially comprises filtering and, if appropriate, amplification of the baseband signal. The baseband signal is finally digitized (see FIG. 3, analog-to-digital converter 30) and processed further in the digital domain. The digital signal processing chain can be realized at least partly as software which can, for example, be executed on a processor, for example a microcontroller or a digital signal processor (see FIG. 3, DSP 40). The overall system is generally controlled using a system controller 50, which can likewise be implemented at least partly as software which can be executed on a processor such as e.g. a microcontroller. The RF front end 10 and the analog baseband signal processing chain 20 (and optionally also the analog-to-digital converter 30 and parts of the digital signal processing) can be jointly integrated in a single MMIC (e.g. an RF semiconductor chip). Alternatively, the individual components can also be distributed among a plurality of integrated circuits.

Figure 4:
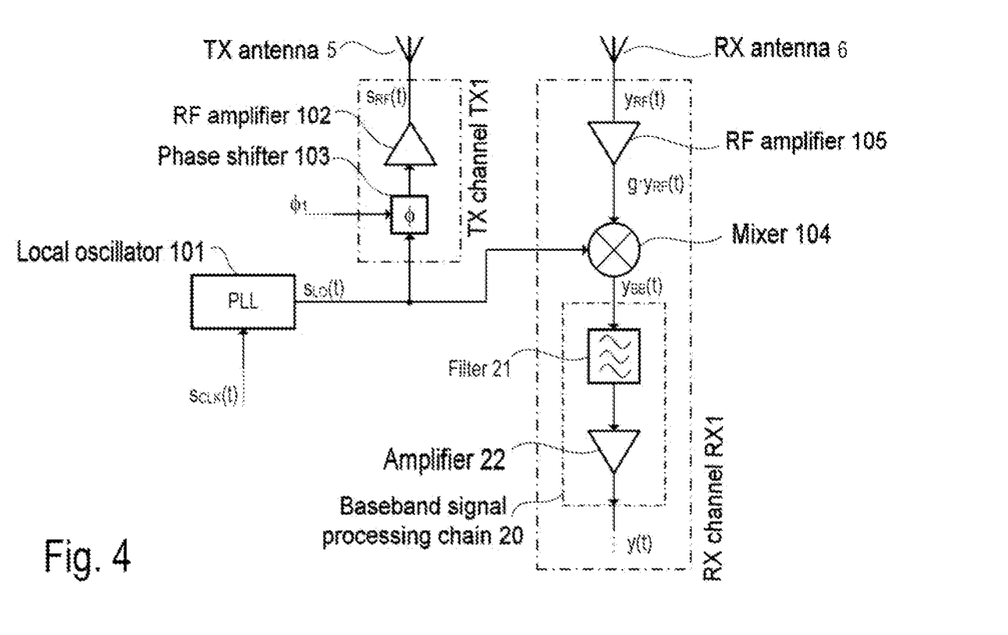
FIG. 4 is a simplified block diagram for illustrating an example implementation of a transmitting channel and of a receiving channel of a radar system.

FIG. 4 illustrates an example implementation of the RF front end 10 with baseband signal processing chain 20 connected downstream, which can be part of the radar sensor from FIG. 3. It should be noted that FIG. 4 illustrates a simplified circuit diagram in order to show the fundamental structure of the RF front end with one transmitting channel (TX channel TX01) and one receiving channel (RX channel RX01). Actual implementations, which may depend greatly on the specific application, can be more complex, of course, and generally comprise a plurality of TX and/or RX channels. The RF front end 10 comprises a local oscillator 101 (LO), which generates an RF oscillator signal $s_{LO}(t)$. The RF oscillator signal $s_{LO}(t)$, as described above with reference to FIG. 2, can be frequency-modulated and is also referred to as LO signal. In radar applications, the LO signal usually lies in the SHF (Super High Frequency, centimeter-wave) or in the EHF (Extremely High Frequency, millimeter-wave) band, e.g. in the interval of 76 GHz to 81 GHz or in the 24 GHz ISM band (Industrial, Scientific and Medical band) in some automotive applications. It goes without saying that other frequency bands can also be used.

The LO signal $s_{LO}(t)$ is processed both in the transmission signal path (in the TX channel) and in the reception signal path (in the RX channel). The transmission signal $s_{RF}(t)$ (cf.

FIG. 2), emitted by the TX antenna 5, is generated by amplifying the LO signal $s_{LO}(t)$, for example using the RF power amplifier 102, and is thus merely an amplified version of the LO signal $s_{LO}(t)$. The phase shifter 103 can optionally bring about an additional adaptation of the phase of the transmission signal $s_{RF}(t)$ by a phase shift $\phi_1$. The output of the amplifier 102 can be coupled to the TX antenna 5 (in the case of a bistatic or pseudo-monostatic radar configuration). The reception signal $y_{RF}(t)$ received by the RX antenna 6 is fed to the receiver circuit in the RX channel and thus directly or indirectly to the RF port of the mixer 104. In the present example, the RF reception signal $y_{RF}(t)$ (antenna signal) is preamplified using the amplifier 102 (gain g). The amplified RF reception signal $g \cdot y_{RF}(t)$ is thus fed to the mixer 104. The amplifier 102 can be e.g. an LNA. The LO signal $s_{LO}(t)$ is fed to the reference port of the mixer 104, such that the mixer 104 down-converts the (preamplified) RF reception signal $y_{RF}(t)$ to baseband. The down-converted baseband signal (mixer output signal) is designated by $y_{BB}(t)$. The baseband signal $y_{BB}(t)$ is firstly processed further in analog fashion, wherein the analog baseband signal processing chain 20 substantially brings about amplification (amplifier 22) and filtering (e.g. bandpass filter 21 or a combination of high-pass filter and low-pass filter) in order to suppress undesired sidebands and image frequencies. The resulting analog output signal, which is fed to an analog-to-digital converter (see FIG. 3, ADC 30), is designated by $y(t)$. Methods for the digital further processing of the output signal (digital radar signal $y[n]$) are known per se (for example range Doppler analysis) and therefore will not be discussed in further detail here.

In the present example, the mixer 104 down-converts the preamplified RF reception signal $g \cdot y_{RF}(t)$ (e.g. the amplified antenna signal) to baseband. The mixing can take place in one stage (that is to say from the RF band directly to baseband) or via one or more intermediate stages (that is to say from the RF band to an intermediate frequency band and further to baseband). In this case, the reception mixer 104 effectively comprises a plurality of individual mixer stages connected in series. In some radar systems, IQ demodulators are used as mixers in order to obtain an analytical baseband signal (having in-phase and quadrature components).

Figure 5:
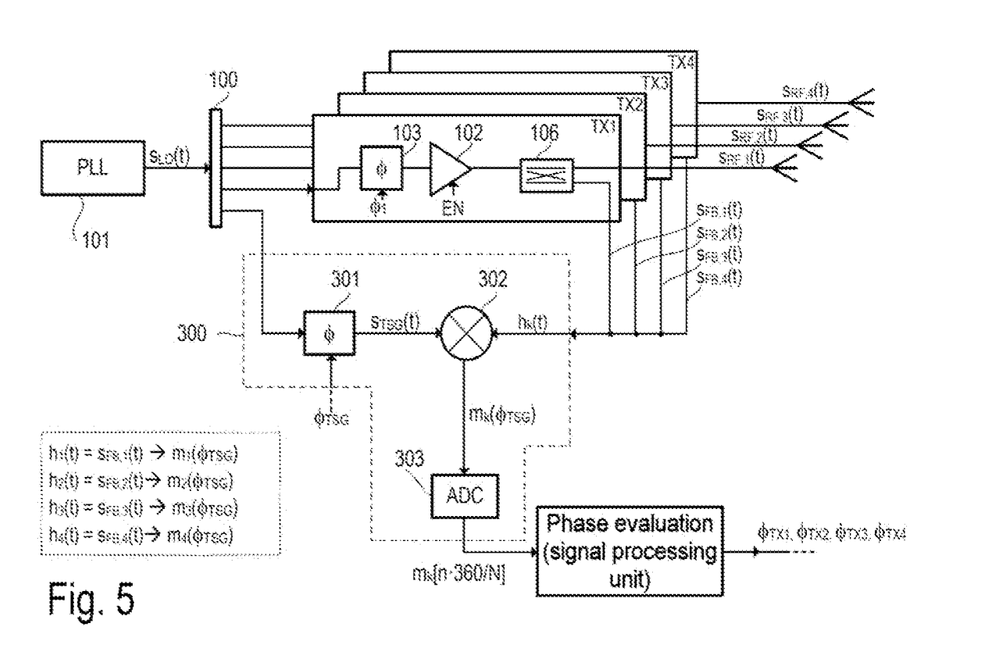
FIG. 5 is a block diagram for illustrating an example radar system having a multiplicity of RF output channels and a measuring circuit for measuring the phases of the RF output signals of the RF output channels.

FIG. 5 illustrates one example of part of a radar transceiver, essentially those components needed for the further discussion being illustrated. The example from FIG. 5 illustrates a radar transceiver having a plurality of TX channels TX1, TX2, TX3 and TX4, the RF output signals $s_{RF,1}(t)$, $s_{RF,2}(t)$, $s_{RF,3}(t)$ and $s_{RF,4}(t)$, respectively, of which are emitted via corresponding TX antennas. The individual TX channels can be set up for example like the TX channel in FIG. 4. Furthermore, in each of the TX channels TX1, TX2, TX3 and TX4, a coupler 106 is arranged in the RF signal path upstream of (and as close as possible to) the antenna port, the coupler being configured to branch off part of the signal power of the respective RF output signal $s_{RF,1}(t)$, $s_{RF,2}(t)$, $s_{RF,3}(t)$ and $s_{RF,4}(t)$ and to make it available as a test signal. The test signals are designated by $s_{FB,1}(t)$, $s_{FB,2}(t)$, $s_{FB,3}(t)$ and $s_{FB,4}(t)$ and are essentially a scaled version of the corresponding RF output signals $s_{RF,1}(t)$, $s_{RF,2}(t)$, $s_{RF,3}(t)$ and $s_{RF,4}(t)$, respectively. In particular, the test signals $s_{FB,1}(t)$, $s_{FB,2}(t)$, $s_{FB,3}(t)$ and $s_{FB,4}(t)$ have substantially the same phase as the corresponding RF output signals $s_{RF,1}(t)$, $s_{RF,2}(t)$, $s_{RF,3}(t)$ and $s_{RF,4}(t)$, respectively.

The TX channels TX1, TX2, TX3 and TX4 generate the respective RF output signals $s_{RF,1}(t)$, $s_{RF,2}(t)$, $s_{RF,3}(t)$ and $s_{RF,4}(t)$ (and also the associated test signals $s_{FB,1}(t)$, $s_{FB,2}(t)$, $s_{FB,3}(t)$ and $s_{FB,4}(t)$) from the LO signal $s_{LO}(t)$ fed to all the TX channels. The RF output signals $s_{RF,1}(t)$, $s_{RF,2}(t)$, $s_{RF,3}(t)$ and $s_{RF,4}(t)$ are essentially phase-shifted and amplified versions of the LO signal $s_{LO}(t)$. The LO signal $s_{LO}(t)$ is generated by a local oscillator 101 and distributed to the individual TX channels TX1, TX2, TX3 and TX4 by way of the signal distribution circuit 100. The signal distribution circuit can be e.g. a purely passive RF component and include for example one or more power dividers.

The example from FIG. 5 also includes a measuring circuit 300 for measuring the phases of the test signals $s_{FB,1}(t)$, $s_{FB,2}(t)$, $s_{FB,3}(t)$ and $s_{FB,4}(t)$. As mentioned, the test signals $s_{FB,1}(t)$, $s_{FB,2}(t)$, $s_{FB,3}(t)$ and $s_{FB,4}(t)$ have substantially the same phase as the corresponding RF output signals $s_{RF,1}(t)$, $s_{RF,2}(t)$, $s_{RF,3}(t)$ and $s_{RF,4}(t)$, respectively, and the measurement result thus also represents the phases of the radar signals emitted by the TX antennas. For carrying out a phase measurement, the local oscillator 101 is in continuous wave (CW) operation and in each case only one of the TX channels is active, while the other TX channels are deactivated (for example by the respective power amplifiers 102 being deactivated). For the following explanation it is assumed that the first TX channel TX1 is active. The test signal fed to the measuring circuit 300 is designated by $h_1(t)$ and $h_1(t)=s_{FB,1}(t)$ holds true. In general, in FIG. 5, the presently active TX channel is designated by TXk and the test signal fed to the measuring circuit 300 is $h_k(t)=s_{FB,k}(t)$.

As mentioned, the measuring circuit 300 receives the test signal $h_1(t)$ of the active TX channel TX1 and the LO signal $s_{LO}(t)$ provided by the signal distribution circuit 100. The measuring circuit 300 includes a phase shifter 301, which shifts the phase of the LO signal $s_{LO}(t)$ by the phase value $\phi_{TSG}$. The phase-shifted LO signal is designated by $s_{TSG}(t)$. The measuring circuit 300 further includes one mixer 302 configured to mix the signals $s_{TSG}(t)$ and $h_1(t)$. Since the local oscillator 101 is in CW operation, as mentioned, all the RF signals have the same frequency $f_{LO}$, and, after low-pass filtering, the output signal of the mixer 302 is a DC voltage dependent on the phase value $\phi_{TSG}$. The mixer output signal assigned to the test signal $h_1(t)$ is designated by $m_1(\phi_{TSG})$, and the signal $m_1(\phi_{TSG})$ includes information about the phase of the test signal $h_1(t)$ and thus also about the phase of the associated RF radar signal $s_{RF,1}(t)$. The analog-to-digital converter 303 is configured to digitize the signal $m_1(\phi_{TSG})$; the corresponding digital signal is designated by $m_1[\phi_{TSG}]$. The phase information can be determined very simply from the digital signal $m_1[\phi_{TSG}]$ if the analog-to-digital converter 303 samples the mixer output signal $m_1(\phi_{TSG})$ for different phase values $\phi_{TSG}$. The calculation of the sought phase using digital signal processing is particularly simple if the phase values have the form $\phi_{TSG}=n \cdot 360/N$, where $n=0, \ldots, N-1$. If $N=8$, for example, then the $\phi_{TSG}$ can assume the values 0, 45, 90, 135, 180, 225, 270 and 315, e.g. the phase $\phi_{TSG}$ is rotated by a full 360° period in equidistant steps. In this case, the phase can be determined in a simple way from the sequence $m_1[\phi_{TSG}]=m_1[n \cdot 360/N]$ (for $n=0, \ldots, N-1$) using Fourier transformation. The calculation of the phase will be discussed in even greater detail later.

Figure 6:
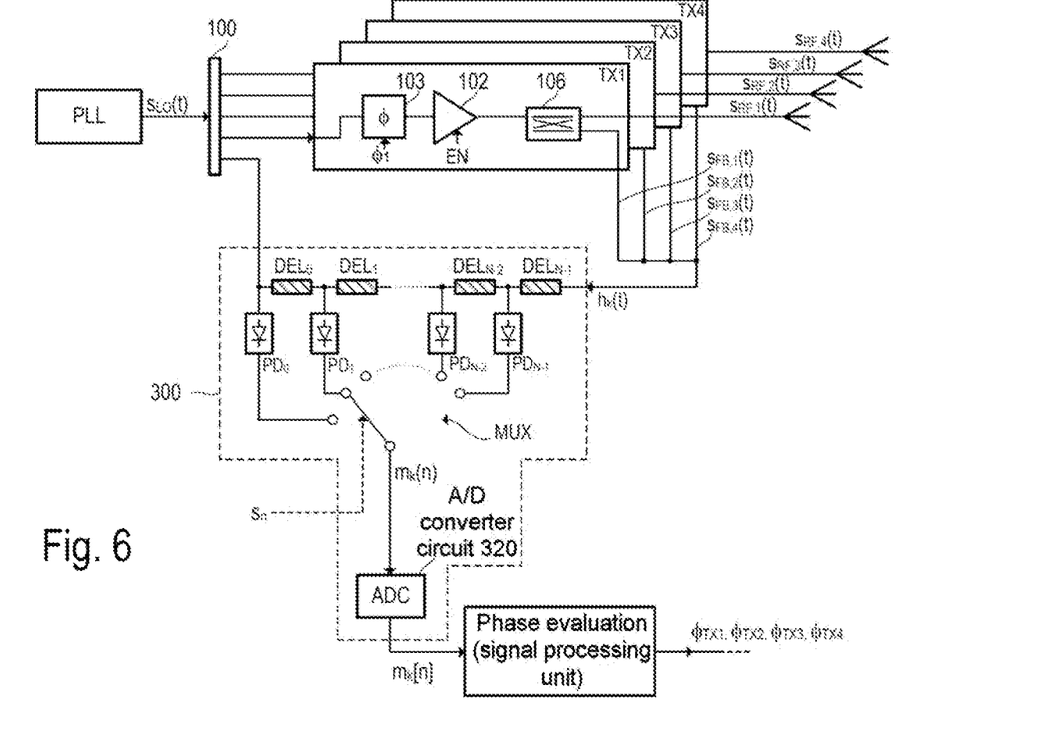
FIG. 6 illustrates an example radar system with a first example implementation of a measuring circuit for measuring the phases of the RF output signals of the RF output channels; the measuring circuit is an alternative to the measuring circuit from FIG. 5.
Figure 7:
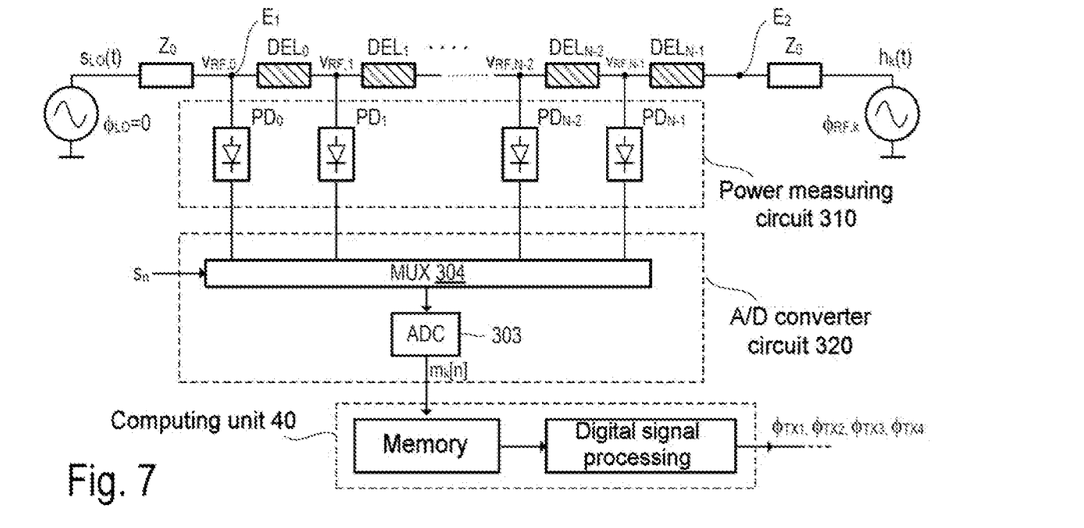
FIG. 7 illustrates the measuring circuit from FIG. 6 in greater detail.

The example from FIG. 5 is based on the mixing of RF signal $s_{TSG}(t)$ (phase-shifted LO signal) and test signal $h_k(t)$, wherein the phase $\phi_{TSG}=n \cdot 360/N$ has to be progressively incremented and the resulting level of the mixer output signal $m_k(\phi_{TSG})$ has to be sampled and digitized. FIG. 6 illustrates a further example of a radar transceiver having a phase measuring circuit, in which the phase of the LO signal $s_{LO}(t)$ does not have to be shifted step by step and which thus allows a faster detection of the sequence $m_1[n \cdot 360/N]$. In accordance with FIG. 6, the measuring circuit 300 comprises a first input node, to which the LO signal $s_{LO}(t)$ is fed, and a second input node, to which the test signal $h_k(t)$ is fed. As in the previous example, the test signal $h_k(t)$ corresponds to one of the test signals $s_{FB,1}(t)$, $s_{FB,2}(t)$, $s_{FB,3}(t)$ and $s_{FB,4}(t)$, depending on which TX channel is currently active. An arrangement comprising a multiplicity of delay elements is connected between the two input nodes, wherein in each case different RF signals can be tapped at different positions of the arrangement. FIG. 7 shows the measuring circuit 300 from FIG. 6 and the subsequent digital signal processing in greater detail. The following explanations refer to FIG. 7.

The voltage sources with series impedance Zo shown in FIG. 7 symbolize the generation of the LO signal $s_{LO}(t)$ and the test signal $h_k(t)$. The series impedances Zo are dimensioned such that as far as possible no reflections occur. That is to say that the series impedances Zo represent the characteristic impedance of the RF lines. The abovementioned arrangement having N delay elements $DEL_0$, $DEL_1$, ..., $DEL_{N-1}$ is connected between the two voltage sources. The number N of delay elements can have the form $N=2^b$, where b is an integer greater than 1. This need not necessarily be the case, however. The delay elements can be implemented using one or more striplines, for example. In one simple example implementation, the arrangement comprises one stripline between the first input node $E_1$ and the second input node $E_2$, the stripline being tapped at different positions. The RF signals at these different positions are designated by $v_{RF,0}$, $v_{RF,1}$, ..., $v_{RF,N-1}$. The line sections (segments) between the tapping points form the abovementioned delay elements.

In another example implementation, the delay elements can be implemented by respective LC circuits (circuits each having an inductance and a capacitance). Each delay element is assigned a detector $PD_0$, $PD_1$, ... $PD_{N-1}$ configured to generate an output signal representing the amplitude (and thus also the power) of the respective RF signal $v_{RF,0}$, $v_{RF,1}$, ..., $v_{RF,N-1}$. In accordance with the example from FIG. 7, each of the detectors $PD_0$, $PD_1$, ... $PD_{N-1}$ is connected to a terminal of a tap of the chain of N delay elements.

Various possibilities for implementing the detectors $PD_1$, $PD_2$, ... $PD_{N-1}$ are known per se and will not be discussed any further here. Integrated power detectors and similar circuits can be integrated into the RF frontend of a radar transceiver without any problems. The output signals supplied by the detectors $PD_0$, $PD_1$, ... $PD_{N-1}$ are digitized (see FIG. 7, analog-to-digital converter circuit 320), and the digitized values are stored. Given N delay elements $DEL_0$, $DEL_1$, ..., $DEL_{N-1}$ and thus N detectors $PD_0$, $PD_1$, ... $PD_{N-1}$, N digital values are obtained. In the example in accordance with FIG. 7, the analog-to-digital converter circuit 320 includes a multiplexer 304 and an analog-to-digital converter 303. With the aid of the multiplexer 304, the output signals of the detectors $PD_1$, $PD_2$, ... $PD_{N-1}$ can be successively sampled and digitized. In order to enable the output signals of the detectors $PD_0$, $PD_1$, ... $PD_{N-1}$ to be sampled in parallel, sample & hold circuits enabling parallel sampling and subsequent sequential digitization can be connected between the inputs of the multiplexer 304 and the individual detectors $PD_0$, $PD_1$, ... $PD_{N-1}$.

Figure 8:
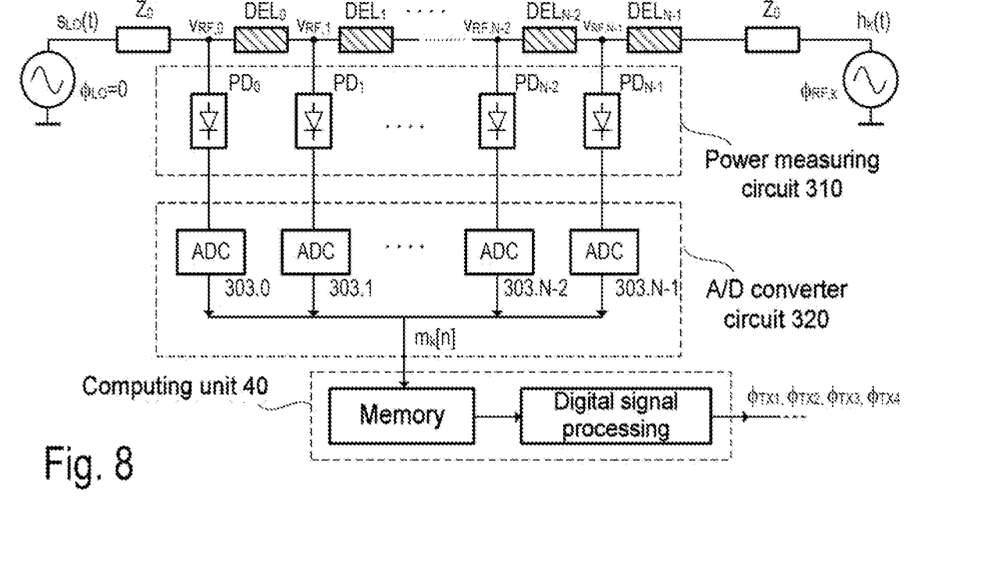
FIGS. 8 and 9 illustrate by way of example alternative implementations of the measuring circuit from FIG. 7.

The example from FIG. 8 differs from the example from FIG. 7 merely in the construction of the analog-to-digital converter circuit 320. In accordance with FIG. 8, the analog-to-digital converter circuit 320 comprises an analog-to-digital converter 303.0, 303.1, ..., 303.N−1 for each of the detectors $PD_0$, $PD_1$, ... $PD_{N-1}$. In this case, a multiplexer is not necessary and the output signals of the detectors $PD_0$, $PD_1$, ... $PD_{N-1}$ can be digitized in parallel in one step. As in the example from FIG. 7, the digitized values can be stored in a memory contained in a computing unit 40. The computing unit 40 is configured to calculate the phase $\phi_{TX1}$, $\phi_{TX2}$, $\phi_{TX3}$ or $\phi_{TX4}$ of the respective test signal $h_k(t)$ (for k=1, 2, 3, 4) from the stored values (digitized output values of the detectors $PD_0$, $PD_1$, ... $PD_{N-1}$). As mentioned, the phase of the test signal corresponds to the phase $\phi_{RF,1}$, $\phi_{RF,2}$, $\phi_{RF,3}$ or $\phi_{RF,4}$ of the corresponding RF output signal $s_{RF,1}(t)$, $s_{RF,2}(t)$, $s_{RF,3}(t)$ and $s_{RF,4}(t)$, respectively.

Figure 9:
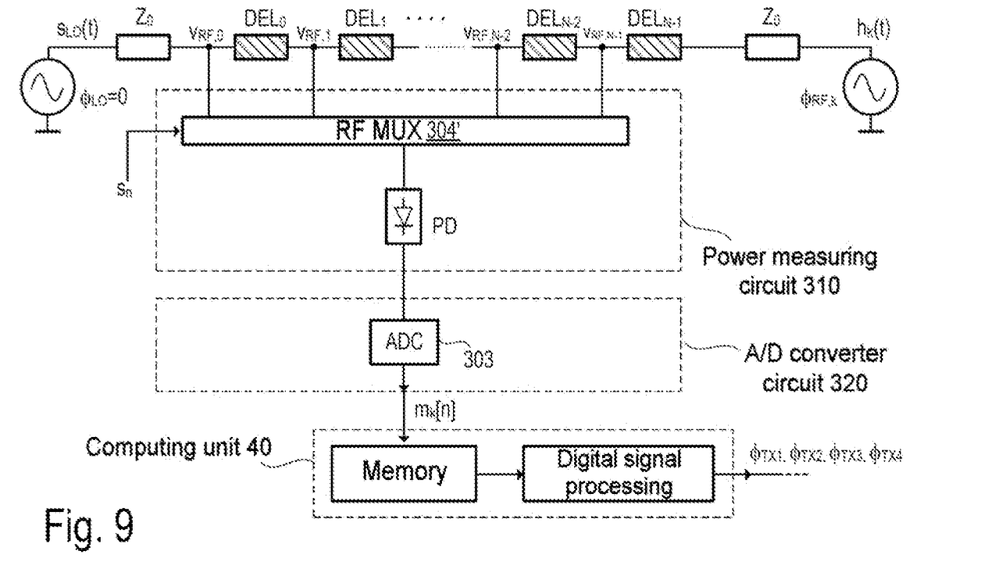

In the example from FIG. 9, an RF multiplexer 304' is connected between the delay elements $DEL_0$, $DEL_1$, ..., $DEL_{N-1}$. In this case, only one detector PD is necessary, which is connected sequentially to all the delay elements $DEL_0$, $DEL_1$, ..., $DEL_{N-1}$ with the aid of the multiplexer 304' in order to determine the amplitude/power of the RF signals $v_{RF,0}$, $v_{RF,1}$, ..., $v_{RF,N-1}$. In this example, likewise only one analog-to-digital converter 303 is necessary in order to sequentially digitize the analog output values of the detector PD. For the rest, the circuit from FIG. 9 functions substantially identically to the circuit from FIG. 7 (just the order of multiplexer and detector(s) is interchanged, which is why only one detector is necessary). It should be mentioned at this juncture that an RF multiplexer 304' may be more difficult to implement than the multiplexer 304 in the example from FIG. 7.

In the example implementations described here, a superposition of the signals $s_{LO}(t)$ and $h_k(t)$ takes place in the chain (series circuit) of delay elements $DEL_0$, $DEL_1$, ... $DEL_{N-1}$. This superposition leads to a standing wave in the chain of delay elements. All the delay elements bring about the same delay $\Delta t$. This need not necessarily be the case, but may simplify the subsequent signal processing. The N delay elements $DEL_0$, $DEL_1$, ..., $DEL_{N-1}$ together bring about a total delay of $N \cdot \Delta t$, where the total delay $N \Delta t$ can be equal to a period duration $T_{LO}=f_{LO}^{-1}$ of the local oscillator (or an integral multiple thereof). That need not necessarily be the case either, but simplifies the subsequent signal processing. The number N of delay elements can be a power of two, e.g. $N=2^b$, where b is an integer greater than or equal to 1. At a frequency of $f_{LO}=80$ GHz, the period duration $T_{LO}$ is 12.5 ps, which corresponds to a wavelength $\lambda_{LO}$ of approximately 1.9 mm (given a relative permittivity of $\varepsilon_R \approx 4$). Given N=8 delay elements, for example, each delay element can be implemented by a line section having a length of around 235 μm. The line sections can be integrated e.g. in a metallization layer of a semiconductor chip.

On account of the abovementioned superposition of the signals $s_{LO}(t)$ and $h_k(t)$ and since all the RF signals have the same frequency $f_{LO}$, at the individual delay elements $DEL_0$, $DEL_1$, ..., $DEL_{N-1}$ it is possible to tap off in each case an RF signal whose amplitude is constant and is dependent on the phase of the test signal $h_k(t)$ (what is meant here is the phase of the test signal relative to the phase $\phi_{LO}$ of the LO signal $s_{LO}(t)$, wherein the phase $\phi_{LO}$ is assumed to be zero below, without restricting the generality). That is to say that a standing wave which can be characterized by a complex amplitude $v_{RF,n}^*$ forms in the chain of delay elements $DEL_0$, $DEL_1$, ..., $DEL_{N-1}$ (between the first and the second input nodes). The complex amplitude $v_{RF,n}^*$ depends on the position along the chain of delay elements $DEL_0$, $DEL_1$, ..., $DEL_{N-1}$; the position is represented by the index n (n=0, ..., N−1). In the case where the delay elements $DEL_0$, $DEL_1$, ..., $DEL_{N-1}$ all bring about the same delay $\Delta t$, the phase difference $\Delta\phi$ between two adjacent complex amplitudes $v_{RF,n}^*$ and $v_{RF,n+1}^*$ is likewise identical (e.g.

Figure 10A:
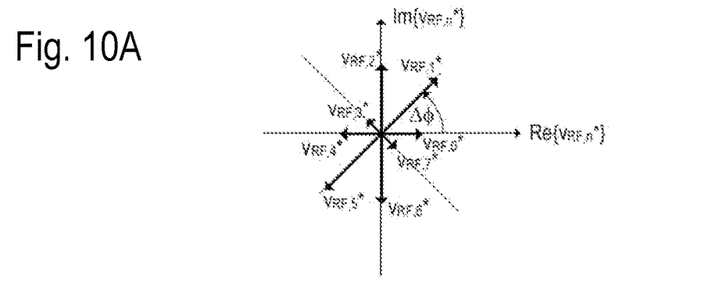
FIGS. 10A-10C are diagrams for illustrating the signal processing that can be used for evaluating the digital values supplied by the measuring circuit.

$\arg\{v_{RF,n}^*\} - \arg\{v_{RF,n+i}^*\} = \Delta\phi$, for all n from 0 to N−2). This substantive matter is illustrated in FIG. 10A.

Figure 10B:
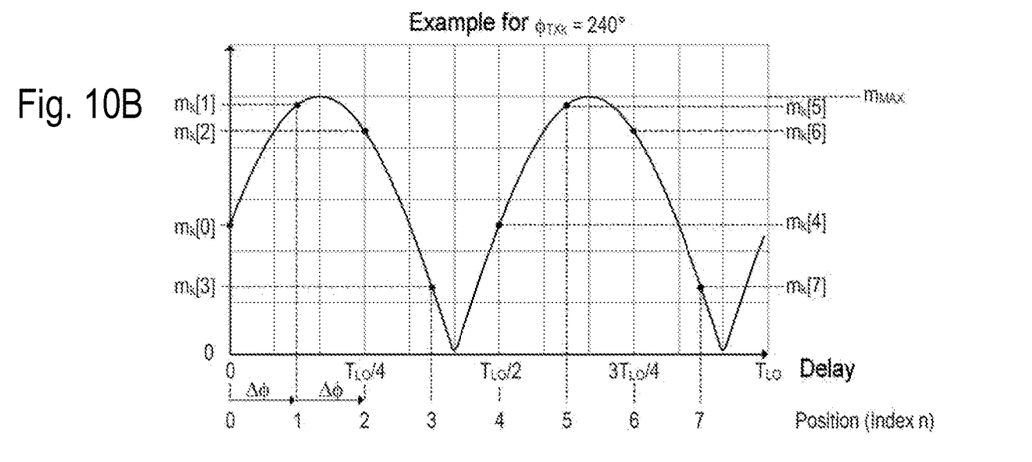

The absolute value $|v_{RF,n}^*|$ of the complex amplitude $v_{RF,n}^*$ thus varies in a position-dependent manner with the index n, denoting the position in the chain of delay elements at which the RF signal $v_{RF,n}$ is tapped off, wherein, in the example implementations described here, the detectors $PD_0, \ldots, PD_{N-1}$ in each case form the absolute value $|v_{RF,n}^*|$ of the associated complex amplitude, e.g. the detectors $PD_0, \ldots PD_{N-1}$ essentially behave like peak value rectifiers and the output signal of the detector $PD_n$ is equal to the absolute value of the respective amplitude. The associated digital value $m_k[n]$ then represents the output value $|v_{RF,n}^*|$ of the respective detector $PD_n$ (n=0, ..., N−1). That is to say that $m_k[n]=|v_{RF,n}^*|$. This substantive matter is also illustrated in FIG. 10B. It can be seen that the sequence $m_k[n]$ for the positions n=0, ..., N−1 has a rectified sinusoidal profile, the phase of which represents the phase $\phi_{TXk}$ of the test signal $h_k(t)$ (for the TX channels TXk, k=1, 2, etc.). Using simple calculations it is possible to show that the phase Phase $\phi_m$ of the sequence $m_k[n]$ corresponds to half the phase $\phi_{TXk}/2$ of the test signal $h_k(t)$ ($\phi_m=\phi_{TXk}/2$). That is to say that $$m_k[n]=|\cos(2\pi n/N+\phi_m)|=|\cos(2\pi n/N+\phi_{TXk}/2)|. \quad (1)$$

Figure 10C:
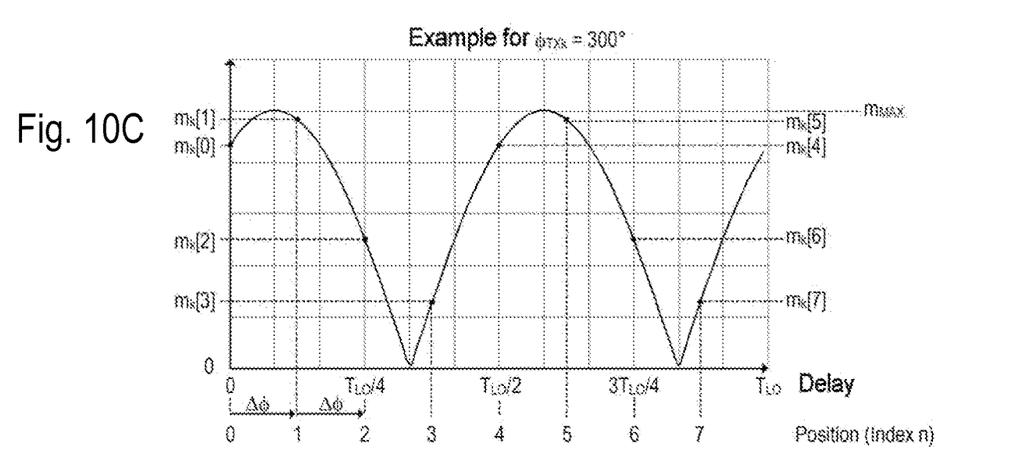

FIG. 10B shows the situation for a phase $\phi_{TXk}$ of the test signal $h_k(t)$ of $\phi_{TXk}=2400$ ($\phi_m=120°$) and diagram (c) shows the situation for a phase $\phi_{TXk}$ of the test signal $h_k(t)$ of $\phi_{TXk}=3000$ ($\phi_m=150°$). If—theoretically—the phase $\phi_{TXk}$ of the test signal $h_k(t)$ were varied from 0° to 360° (phase sweep), then each of the values $m_k[0], m_k[1]$, etc., corresponding to a rectified sine wave, would vary between a minimum value (destructive interference of $h_k(t)$ and $s_{LO}(t)$) and a maximum value (constructive interference of $h_k(t)$ and $s_{LO}(t)$). The minimum value is zero if the amplitudes of test signal $h_k(t)$ and LO signal $s_{LO}(t)$ are identical, which is generally not the case, but can be assumed for the following description, without restricting the generality, in order not to complicate the substantive matter.

The information about the phase $\phi_{TXk}$ of the test signal $h_k(t)$ (relative to the phase $\phi_{LO}$), is already bound in a single digital value, e.g. $m_k[0]$, which in practice will be impaired by noise and measurement errors. For this reason, a plurality of (in particular all N) digital values $m_k[0], \ldots, m_k[N-1]$ are evaluated. This evaluation can be implemented efficiently using a digital Fourier transformation (in particular the Fast Fourier Transform (FFT) algorithm).

The FFT algorithm essentially calculates the coefficients of a Fourier series of a periodic signal. The Fourier series for the function $f(x)=|\sin(x)|$ will be considered in order to clarify the following explanations. The Fourier series can be calculated as follows:

$$f(x) \approx 2/\pi - 4/\pi(\cos(2x)/(1\cdot3)+\cos(4x)/(3\cdot5)+\cos(6x)/(5\cdot7)+\ldots). \quad (2)$$

In view of the equation above it can be ascertained that the sequence $m_k[n]$ has a plurality of harmonics at even multiples of the fundamental frequency. As mentioned, the phase $\phi_m$ of the sequence $m_k[n]$ corresponds to half the phase $\phi_{TXk}/2$ of the test signal $h_k(t)$ under consideration. That is to say that the phase information $\phi_{TXk}$ sought can be determined directly from the phase $2\phi_m$ of the first harmonic (the phase of the first harmonic is double that of the fundamental). As mentioned above, the phase $2\phi_m=\phi_{TXk}$ can be calculated in a simple manner using discrete Fourier transformation. If—as in the example illustrated in FIGS. 10A-C—the chain of delay elements extends over a full period of the standing wave (complex amplitude $v_{RF,k}^*$) (e.g. the index range n=0, ..., N−1 corresponds to a wavelength $\lambda_{LO}$ or an LO period $T_{LO}$), then the relevant "bin" of the discrete Fourier transformation is the third bin (the first bin represents the DC component and the second bin represents the fundamental).

The Fourier transform of the sequence $m_k[n]$ ($m_k[n]=|v_{RF,n}^*|$) is a sequence of equal length, namely $$M_k[j]=\text{FFT}\{m_k[n]\} \quad (3)$$

with the frequency index j, where j=0, ..., N−1. The elements of the sequence $M_k[j]$ are also referred to as "bins" and are complex spectral values in each case. The spectral value $M_k[0]$ represents the DC component (first bin), the spectral value $M_k[1]$ represents the fundamental and is (at least theoretically) zero (second bin), and the spectral value $M_k[2]$ represents the first harmonic (third bin). The phase information sought (e.g. the phase $\phi_{TXk}$ of the test signal $h_k(t)$) is contained in the spectral value $M_k[2]$, representing the first harmonic. The sought phase $2\phi_m=\phi_{TXk}$ is equal to $\arg\{M_k[2]\}$.

It goes without saying that the spectral value $M_k[2]$ of the first harmonic can also be calculated in a different way, for example with the aid of the known Goertzel algorithm. The calculations necessary for determining the sought phase $\phi_{TXk}$ can be carried out by a computing unit. The computing unit can contain a processor that executes software instructions that cause the processor to carry out the calculations mentioned. The calculations can be carried out wholly or partly also by hardwired digital circuits (e.g. multiplier-accumulator (MAC) units) of the computing unit. An FFT, in particular, can be implemented efficiently using MAC units. The computing unit can be for example the digital signal processor 40 (see FIG. 3). It goes without saying that at least some calculations can also be carried out in the system controller 50 (see FIG. 3). The term "computing unit" therefore does not denote a specific unit composed of hardware and software, but rather should be understood as a functional unit, wherein the desired functions can be implemented in one hardware unit or in a plurality of hardware units.

Figure 11:
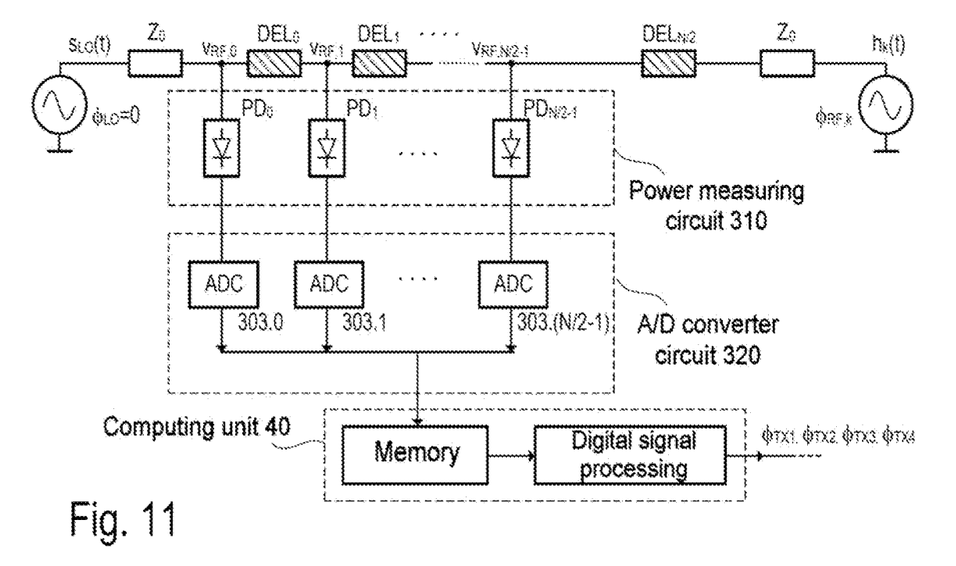
FIG. 11 illustrates a modification of the example from FIG. 8.

The circuit shown in FIG. 11 is a modification of the example from FIG. 8. In accordance with FIG. 11, the chain of delay elements contains only N/2 delay elements $DEL_0, DEL_1, \ldots, DEL_{N/2-1}$ in series with a further delay element $DEL_{N/2}$, which brings about substantially the same delay as the N/2 delay elements $DEL_0, DEL_1, \ldots, DEL_{N/2-1}$ together. Therefore, only half as many detectors and accordingly half as many ADCs are required in comparison with the example from FIG. 8. Accordingly, only half of the digital values $m_k[0], \ldots, m_k[N/2-1]$ are obtained as well. The "missing" half of the digital values $m_k[N/2], \ldots, m_k[N-1]$ is not necessarily required since it contains only redundant information anyway. This can also be discerned in FIGS. 10B and 10C. In FIGS. 10A-C, $m_k[0] \approx m_k[4]$, $m_k[1] \approx m_k[5]$, $m_k[2] \approx m_k[6]$, etc. Nevertheless, noise and measurement errors can lead to differences. In the previous example from FIG. 8, the additional digital values $m_k[N/2], \ldots, m_k[N-1]$ are not unnecessary, however, since the additional measurement values can improve the signal-to-noise ratio (SNR).

In the examples described here, the detectors $PD_n$ are configured to provide at their output a signal representing the amplitude of the RF signal $v_{RF,n}$ at the respective input. As a consequence of this, the sequence $m_k[n]$ (digitized output signals of the detectors $PD_n$) represents a rectified sine wave (see e.g. FIG. 10B). Alternatively, it is also possible to use detectors whose output signals are substantially proportional to the square of the amplitudes of the RF signals $v_{RF,n}$, which corresponds to the power RF signals $v_{RF,n}$. In this case, the sequence $m_k[n]$ represents a cosine wave with double frequency. The Fourier series from equation (2) is finite in this case and follows from the identity $$|\sin(x)|^2 = \sin(x)^2 = 1/2 - \cos(2x)/2. \quad (4)$$

In this case, (theoretically) only the first harmonic exists and the higher harmonics are zero. The digital signal processing for determining the phase $\phi_{TXk}$ of the test signal $h_k(t)$) from the spectrum of the sequence $m_k[n]$ does not change as a result. In this case, too, the spectral value with the phase information sought is the spectral value of the first harmonic and thus in the third bin $M_k[2]$ of the discrete Fourier transform $M_k[n]$, wherein $n=0, \ldots N-1$. Even if the detectors do not square the amplitudes $|v_{RF,n}*|$ "cleanly", but rather distort them nonlinearly, the signal processing necessary for the phase determination does not change as a result. The spectrum calculated in accordance with equation (3) may depend on the transfer response of the detectors, but the phase information sought is not appreciably influenced thereby.

It should be mentioned once again at this juncture that the signals supplied by the detectors (and also the corresponding digital measurement values) representing the amplitude of the RF signals $v_{RF,0}, v_{RF,1}, \ldots v_{RF,N-1}$ (see FIGS. 6 and 10) also represent the power of the RF signals $v_{RF,0}, v_{RF,1}, \ldots v_{RF,N-1}$. For the example implementations described here, amplitude and power represent substantially the same information since the signal power is proportional to the square of the amplitude and is thus directly dependent on the amplitude. Any other value that is a linear or nonlinear distortion (e.g. on account of a nonlinear characteristic of the detectors) of the amplitude nevertheless also represents the amplitude. As mentioned above, the phase information sought is maintained with sufficient accuracy even in the case of nonlinear distortion of the measured amplitude values.

The measuring of the phase $\phi_{TXk}$ of the test signal $h_k(t) = s_{FB,k}(t)$ can be repeated for each transmitting channel TXk (k=1, 2, etc.). To that end, a specific transmitting channel (e.g. TX1) can be selected—one after the other—in order to determine the associated phase (e.g. $\phi_{TX1}$). Afterward the next transmitting channel (e.g. TX2) is selected and the next phase (e.g. $\phi_{TX2}$) is determined, and so on. In order to select a specific transmitting channel TXj, the other transmitting channels TXk (where k≠j) can be deactivated, for example. In order to deactivate a transmitting channel, for example, the amplifier 102 contained in the respective transmitting channel can be deactivated (e.g. using an enable signal EN having a suitable level, see FIG. 6). Alternatively, the test signal $s_{FB,j}(t)$ of the selected transmitting channel TXj can be fed selectively to the measuring circuit 300 (e.g. by way of an RF multiplexer, not illustrated in the figures). Various techniques for selectively routing RF signals are known per se and, therefore, will not be explained any further here.

Figure 12:
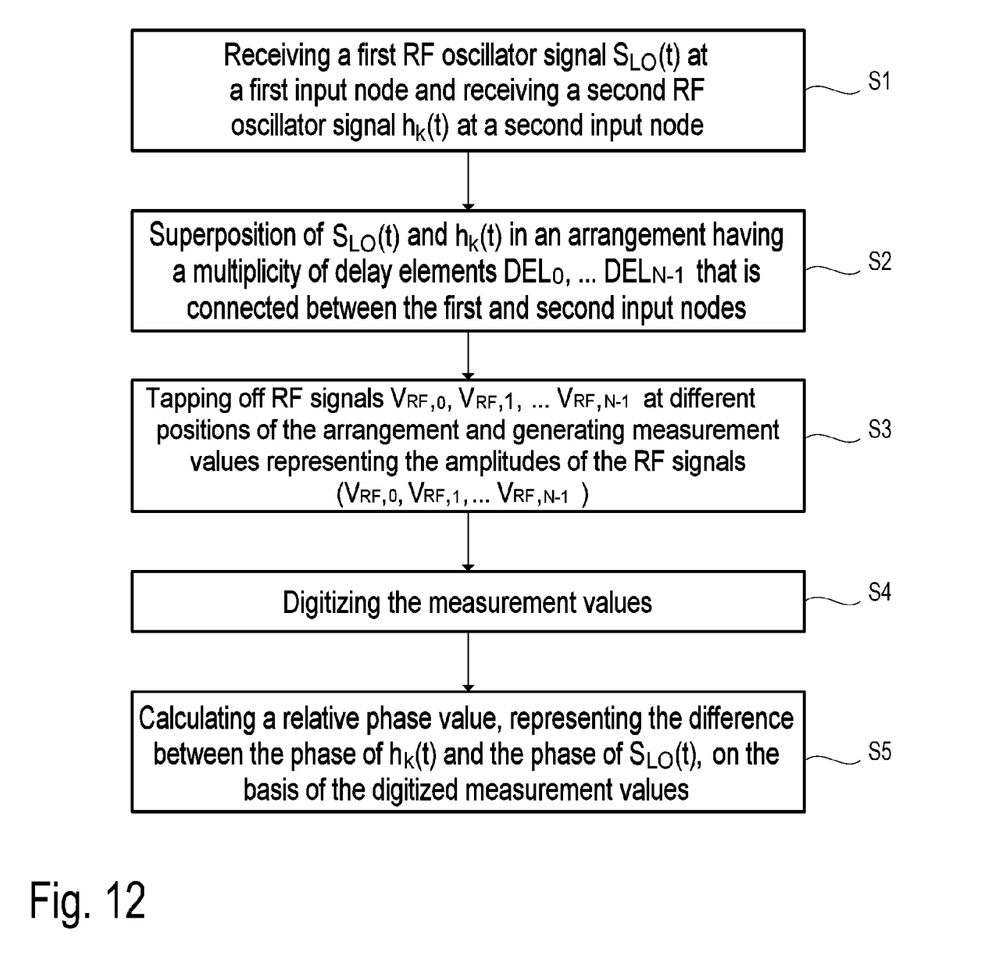
FIG. 12 is a flow diagram for illustrating one example of the method for phase measurement described here.

FIG. 12 is a flow diagram for further illustration of one example of the above-described method for measuring the (relative) phase of the signal $h_k(t)$. In accordance with FIG. 12, the method comprises receiving a first RF oscillator signal (cf. FIGS. 7-9, LO signal $s_{LO}(t)$) at a first input node and receiving a second RF oscillator signal (cf. FIGS. 7-9, test signal $h_k(t)$) at a second input node (FIG. 12, step S). An arrangement having a multiplicity of delay elements (cf. FIGS. 7-9, delay elements $DEL_0, \ldots DEL_{N-1}$) is connected between the first input node and the second input node. A superposition of the first RF oscillator signal and the second RF oscillator signal takes place in the arrangement (see FIG. 12, step S2), wherein corresponding RF signals $v_{RF,0}, v_{RF,1}, \ldots v_{RF,N-1}$ which are a result of the superposition are present at different positions of the arrangement. The RF signals $v_{RF,0}, v_{RF,1}, \ldots v_{RF,N-1}$ can be tapped off at the aforementioned different positions of the arrangement. The method further comprises generating measurement values $m_k(0), m_k(1), \ldots, m_k(N-1)$ representing the amplitudes of the RF signals $v_{RF,0}, v_{RF,1}, \ldots v_{RF,N-1}$ (see FIG. 12, step S3). The measurement values are digitized (see FIG. 12, step S4) and a corresponding sequence of digital measurement values $m_k[0], m_k[1], \ldots, m_k[N-1]$ is obtained (see also FIGS. 10B and 10C). The method further comprises calculating a relative phase value (e.g. phase $\phi_{TX1}$ for transmitting channel TX1) on the basis of the digitized measurement values. The relative phase value represents the difference between the phase of the second RF oscillator signal and the phase of the first RF oscillator signal.

As already mentioned, the relative phase value can be calculated from a complex spectral value which can be determined for example using a Fast Fourier Transform (e.g. spectral value $M_k[2]$ in the third bin of an FFT) or a Goertzel algorithm. The arrangement having the multiplicity of delay elements $DEL_0, \ldots DEL_{N-1}$ can comprise a stripline comprising a multiplicity of segments. The RF signals $v_{RF,0}, v_{RF,1}, \ldots v_{RF,N-1}$ can be tapped off in each case at a first circuit node of the segments (cf. FIGS. 7-9 and FIG. 11). The multiplicity of segments of the stripline can comprise a first segment DEL/2 and a plurality of second segments $DEL_0, \ldots, DE_{N/2-1}$. The second segments $DEL_0, \ldots, DE_{N/2-1}$ can all have the same length (e.g. $\lambda/N$), whereas the first segment has a line length $\lambda/2$ corresponding to the sum of the line lengths (e.g. $(N/2) \times (\lambda/N) = \lambda/2$) of the second segments. This situation is also illustrated in FIG. 11. In the example implementations described here, the arrangement having the multiplicity of delay elements ($DEL_0, \ldots DEL_{N-1}$) overall brings about a delay corresponding to a period duration $T_{LO} = f_{LO}^{-1} = \lambda/c$ (with the wave propagation velocity c) of the first RF oscillator signal (LO signal $s_{LO}(t)$) or an integral multiple thereof. For the case where the total delay is a multiple of the period duration $T_{LO}$, the relevant spectral value from which the relative phase sought is determined is not in the second bin of the discrete Fourier transform, which represents the first harmonic, but rather at a higher harmonic.

The above-described measurement of the phase difference can be used to calibrate transmitting channels, for example of a radar device, with regard to their phase angle. For this purpose, it is possible alternately to activate the corresponding transmitting channels and to carry out the corresponding measurement for each channel. The calibration parameters obtained can be stored and taken into account for example in the setting of the respective phase shifters.

The invention claimed is:

1. A circuit comprising:
    a first input node configured to receive a first RF oscillator signal,
    a second input node configured to receive a second RF oscillator signal,
    an arrangement having a plurality of delay elements connected in series between the first input node and the second input node,
    a measuring circuit configured to receive RF signals present at different positions of the arrangement, and further configured to generate output signals representing amplitude values of the received RF signals;
an analog/digital (A/D) converter circuit configured to generate corresponding digital representations of the amplitude values based on the output signals of the measuring circuit; and
a computing unit configured to calculate, based on the digital representations of the amplitude values, a relative phase value representing a difference between the phase of the second RF oscillator signal and the phase of the first RF oscillator signal.

2. The circuit as claimed in claim 1,
wherein the measuring circuit comprises a plurality of detectors, wherein each of the detectors is coupled to the arrangement at one of the different positions thereof.

3. The circuit as claimed in claim 2,
wherein each of the detectors is coupled to a corresponding delay element of the plurality of delay elements and is configured to provide as output signal a signal indicating the amplitude or a power of the respective RF signal.

4. The circuit as claimed in claim 2,
wherein the A/D converter circuit comprises an A/D converter and a multiplexer configured to selectively couple an analog input of the A/D converter to an output of a selected one of the detectors.

5. The circuit as claimed in claim 2,
wherein the A/D converter circuit comprises a plurality of A/D converters, wherein each of the A/D converters is connected downstream of a corresponding detector.

6. The circuit as claimed in claim 1,
wherein the measuring circuit comprises an RF multiplexer and a detector, wherein the RF multiplexer is configured to selectively couple an input of the detector to a selected one of the plurality of delay elements, and
wherein an output of the detector is coupled to the A/D converter circuit.

7. The circuit as claimed in claim 1,
wherein the computing unit is configured to calculate a spectral value from the digital representations of the amplitude values, wherein the phase value is calculated based on the spectral value.

8. The circuit as claimed in claim 7,
wherein the spectral value is calculated using a Fourier transformation or using a Goertzel algorithm.

9. The circuit as claimed in claim 1,
wherein the arrangement having the plurality of delay elements comprises a stripline comprising a plurality of segments of equal length, wherein each of the segments of the stripline forms a delay element.

10. The circuit as claimed in claim 9,
wherein the plurality of segments of equal length has a line length corresponding to a wavelength of the first RF oscillator signal.

11. The circuit as claimed in claim 1,
wherein the arrangement having the plurality of delay elements comprises a stripline comprising a first segment and a plurality of second segments of equal length, wherein the first segment has a line length corresponding to a sum of the line length of the second segments.

12. The circuit as claimed in claim 1,
wherein the arrangement having the plurality of delay elements brings about a delay of a period duration of the first RF oscillator signal or an integral multiple thereof.

13. The circuit as claimed in claim 1,
wherein the amplitude values of the received RF signals are dependent on the respective positions in the arrangement having the plurality of delay elements and have a sinusoidal profile or a rectified sine profile.

14. A radar system comprising:
a local oscillator configured to generate an RF oscillator signal;
at least one transmitting channel, to which the RF oscillator signal is fed and which is configured, based on the RF oscillator signal, to generate an RF output signal and to generate a test signal representing the RF output signal;
a phase measuring circuit having a first input node, to which the RF oscillator signal is fed, and having a second input node, to which the test signal is fed;
wherein the phase measuring circuit further comprises the following:
an arrangement having a plurality of delay elements connected in series between the first input node and the second input node,
a measuring circuit configured to receive RF signals present at different positions of the arrangement, and configured to generate output signals representing amplitude values of the received RF signals;
an analog/digital (A/D) converter circuit configured to generate corresponding digital representations of the amplitude values based on the output signals of the measuring circuit; and
a computing unit configured to calculate, based on the digital representations of the amplitude values, a relative phase value representing a difference between the phase of the test signal and the phase of the RF oscillator signal.

15. A method for phase measurement comprising:
receiving a first RF oscillator signal at a first input node and receiving a second RF oscillator signal at a second input node, wherein an arrangement having a plurality of delay elements is connected between the first input node and the second input node, and wherein corresponding RF signals representing a superposition of first RF oscillator signal and second RF oscillator signal are present at different positions of the arrangement;
generating measurement values representing amplitudes of the RF signals;
generating digital representations of the measurement values; and
calculating a relative phase value, representing a difference between the phase of the second RF oscillator signal and the phase of the first RF oscillator signal, based on the digital representations of the measurement values.

16. The method as claimed in claim 15, wherein calculating a phase value further comprises:
storing the digital representations of the measurement values,
calculating a spectral value based on the stored values, and
calculating the relative phase value from the spectral value.

17. The method as claimed in claim 15,
wherein the arrangement having the plurality of delay elements comprises a stripline comprising a plurality of segments, and
wherein RF signals are tapped off in each case at a first circuit node of the segments.

18. The method as claimed in claim 17,
wherein the plurality of segments of the stripline comprise a first segment and a plurality of second segments, wherein the second segments have a same length and wherein the first segment has a line length corresponding to a sum of the line lengths of the second segments.

19. The method as claimed in claim 15,
wherein the arrangement having the plurality of delay elements overall brings about a delay corresponding to a period duration of the first RF oscillator signal or an integral multiple thereof.

* * * * *